United States Patent [19]

Beloncik et al.

[11] Patent Number: 5,058,853
[45] Date of Patent: Oct. 22, 1991

[54] VIBRATION ISOLATION MOUNT SYSTEM

[75] Inventors: Scott J. Beloncik, Windsor; Kenneth P. Hansen; Michael A. Gillott, both of Somers, all of Conn.

[73] Assignee: United Technologies Corporation, Hartford, Conn.

[21] Appl. No.: 358,293

[22] Filed: May 26, 1989

[51] Int. Cl.$^5$ .......................................... F16M 13/00
[52] U.S. Cl. .................................. 248/634; 248/638; 60/39.31
[58] Field of Search ............... 248/542, 560, 618, 619, 248/621, 632, 633, 634, 638, 27.3, 154; 267/141; 60/39.31

[56] References Cited

U.S. PATENT DOCUMENTS

| | | | |
|---|---|---|---|
| 2,103,154 | 12/1937 | Faber | 248/634 |
| 2,717,748 | 9/1955 | Martinet | 248/634 |
| 2,919,882 | 1/1960 | Barkalow | 248/632 |
| 3,145,678 | 8/1964 | Shmorhun | 248/632 |

FOREIGN PATENT DOCUMENTS 289045 2/1953 Switzerland ........................ 248/634

Primary Examiner—Ramon O. Ramirez
Assistant Examiner—Robert A. Olson
Attorney, Agent, or Firm—Lloyd D. Doigan

[57] ABSTRACT

In a fuel control, the body of a feedback resolver is isolated from vibratory fields within a housing in which it is mounted while maintaining alignment of its gear with a fuel control linkage. The resolver is isolated by disposing a first means radially about the feedback device, disposing a second means between the bottom of the feedback device and the housing and disposing a third means at the top of the housing, the means at the top of the housing and at the bottom of the housing being compressed such that the resolver maintains its axial relationship with the fuel control linkage while isolating the resolver from vibratory fields encountered within the housing.

4 Claims, 2 Drawing Sheets

VIBRATION ISOLATION MOUNT SYSTEM

TECHNICAL FIELD

This invention relates to a fuel control feedback system and more particularly to a means for protecting a fuel control feedback system from excessive vibration.

BACKGROUND ART

Some gas turbine fuel controls are regulated by an electronic controller (EEC). The EEC sends control signals to a metering valve within the fuel control. The metering valve, in turn, regulates the weight flow of fuel to the gas turbine engine.

An interface is required between the metering valve and the EEC. The interface provides feedback signals which apprise the EEC of the position of the metering valve. Fuel flow to the gas turbine engine may be accurately controlled thereby.

Typically, the interface is provided by a linkage system between the metering valve and the EEC. The linkage system includes a linkage attaching to and positioned by the metering valve, a position sensor, such as a resolver, which sends feedback signals to the EEC and a segment gear assembly arranged between the linkage and the position sensor. The resolver has a central rotor which has a gear attached thereto. The gear, and the rotor attached thereto, are positioned by the segment gear assembly.

The resolver is a variable transformer. Rotation of the rotor via the linkage varies the output of the transformer to provide feedback signals to the EEC as to the position of the metering valve.

Fuel controls for gas turbine engines may be subjected to vibratory fields. Some vibratory fields may stimulate resonant modes within the position sensor resulting in excessive wear in the connection (i.e the gear attaching to the rotor and the segment gear assembly) between the position sensor and the linkage. The wear may increase the backlash in the linkage system. The EEC may not be provided with accurate feedback as to the exact position of the fuel metering valve. Significant fuel flow errors resulting in engine overspeed or shutdown may then occur.

DISCLOSURE OF THE INVENTION

It is an object of the invention to provide accurate feedback to a fuel control EEC as to the position of a fuel metering valve even though vibratory fields may be encountered.

It is an object of the invention to provide a fuel control assembly having improved vibration mounting of the control's feedback resolver within the fuel control housing.

According to the invention, an improved fuel control assembly of the type having a housing, a metering valve mounted in the housing for regulating fuel flow, and position feedback apparatus, including a resolver assembly having a rotor coupled at a shaft end thereof to the metering valve to provide a signal indication of metering valve position, includes: a housing cavity adapted to receive the resolver therein, the cavity having a volume larger than the displacement of the resolver body to permit the resolver to be positioned therein with a spatial void therebetween, a plurality of resilient material, compressible, vibration isolators adapted for placement within the spatial void, between the resolver body and the cavity inner wall, to positionally fix the resolver in spaced relation to the cavity inner wall surface, and mounting apparatus for engaging a first end of the resolver body with the control housing in a manner to provide compressive loading of the resolver body against the vibration isolators, within the cavity.

In further accord with the invention, vibration isolators are placed in position along the resolver body at points radial to the resolver's rotor axis, to minimize radial displacement of the rotor in response to forces applied to the control housing. In still further accord with the present invention, vibration isolators are placed at the opposite axial ends of the resolver body, one between the resolver first end and the mounting apparatus and another between the cavity wall and the resolver body at the rotor mounting location, to minimize axial displacement of the rotor in response to forces applied to the control housing.

These and other objects, features, advantages of the present invention will become more apparent in light of the detailed description of a best mode embodiment thereof, as illustrated in the accompanying drawings.

BEST MODE FOR CARRYING OUT THE INVENTION

Figure 1:
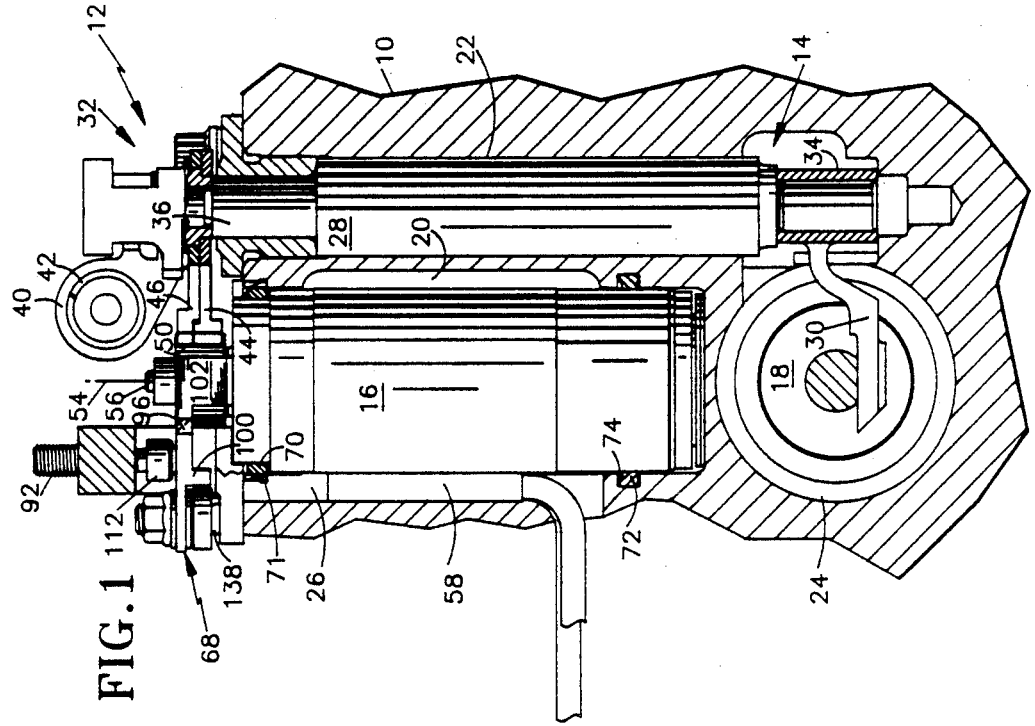
FIG. 1 is a perspective view, partly broken away, of a fuel control linkage employing the concepts of the invention.

Referring to FIG.1, a housing 10 for a fuel control 12 is shown. The housing encases a linkage 14, a position sensor such as a resolver 16, and a metering valve (shown partially at 18). The housing has a first opening 20, a second opening 22 and a third opening 24. The cylindrical first opening 20 receives the resolver 16. A roughly rectangular keyway 26 extends into the housing along the first opening. The roughly cylindrical second opening 22 houses the linkage 14. The cylindrical third opening 24 houses the metering valve 18.

The linkage 14, consists of a shaft 28, a follower arm 30, and a segment gear assembly 32. The shaft 28, which rotates within the second opening 22, has a first end portion 34 and a second end portion 36. The follower arm 30 is fixedly attached to the first end portion 34. The segment gear assembly 32, which rotates with the shaft, is fixedly attached to the second end portion 36.

Figure 3:
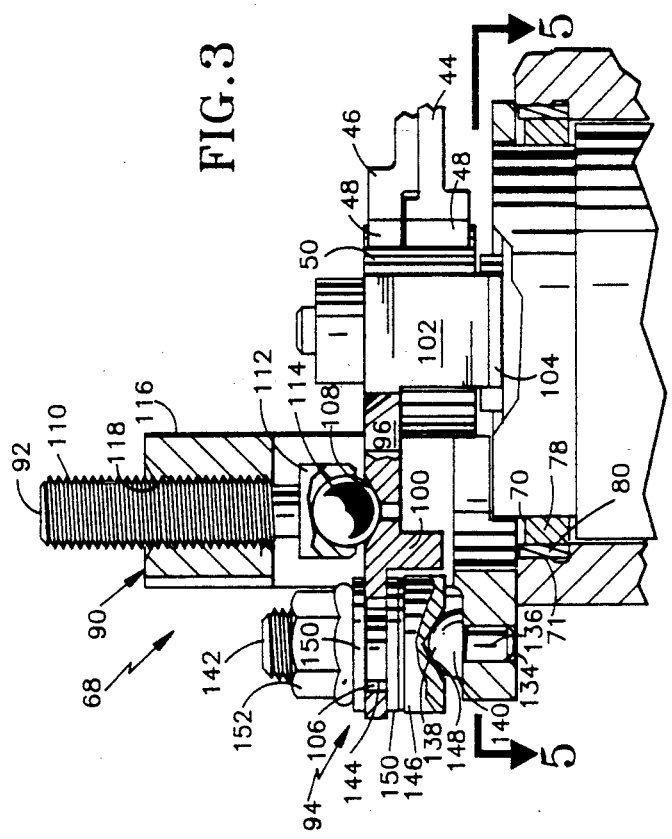
FIG. 3 is a view partially broken away and expanded of FIG. 1.
Figure 4:
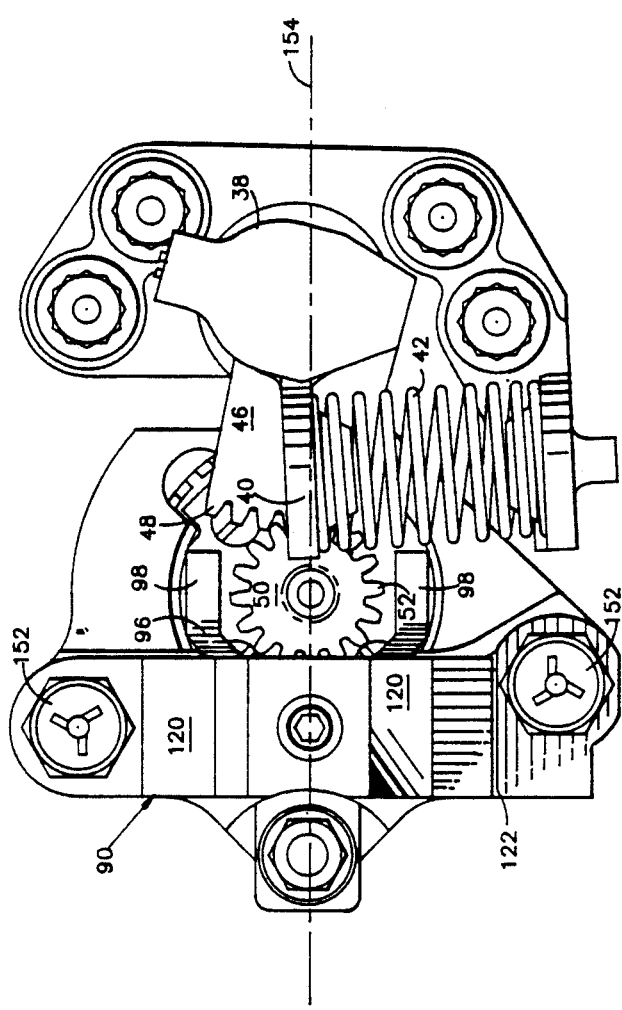
FIG. 4 is a top view, partially broken away and expanded of FIG. 1.

Referring to FIGS. 1 and 4, the segment gear assembly 32 comprises; a roughly cylindrical hollow body 38, a spring seat arm 40 extending from the cylindrical body, an anti-backlash spring 42, a first segment gear rigidly attached to the body 44 (see also FIG. 3), and a second segment gear 46 mounted for rotation about the body. The second end portion 36 is positioned within the hollow body. A spring (not shown) is disposed within an internal chamber (not shown) between the segments gears to load the second segment gear 46 for rotation relative to the first segment gear 44 about the second end portion.

Each segment gear has a plurality of gear teeth 48 for mating with a gear 50 (see also FIG. 4) attaching to the resolver 16. The spring (not shown) forces the teeth of the second segment gear towards the teeth of the first segment gear thereby trapping the teeth 52 of the gear 50 therebetween.

Figure 5:
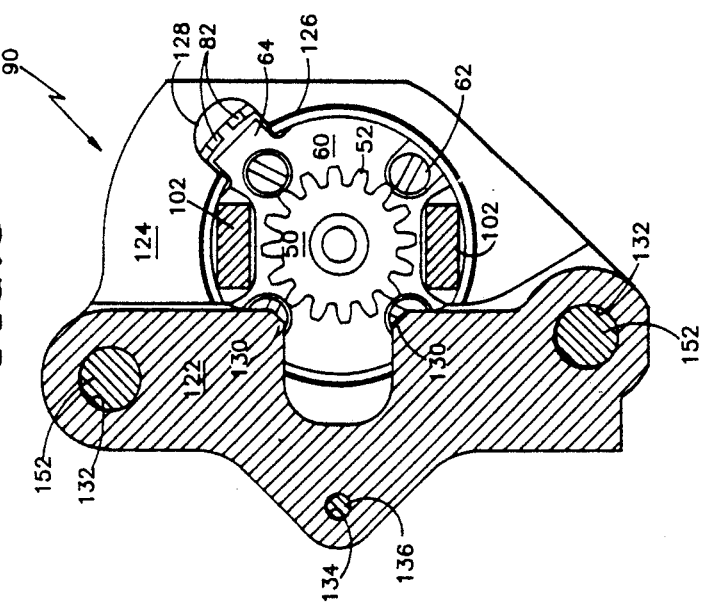
FIG. 5 is a top view, partially broken away, taken along line 5—5 of FIG. 3.

The resolver 16 is positioned about an axis 54 within the first opening 20. A resolver shaft 56 is aligned in parallel with the axis. Rotation of the shaft varies the resolver output. The output is transmitted to an EEC (not shown) via electrical lines 58 which are disposed in the keyway 26. The resolver has a plate 60 attached to an upper surface thereof (see FIG.5) by means of a suitable attachment such as screws 62. The plate has a tab 64 extending therefrom. The resolver is suspended within the first opening 20 by means of a vibration isolation system (or kit) to minimize the effects of vibrational fields which may be encountered in the fuel control 12.

A vibration isolation system or kit consists of: at least one radial isolator, a lower axial isolator 66 (see also FIG. 2), and an upper axial isolator assembly 68 (see also FIG. 3).

The radial isolator, which is comprised of an upper radial isolator 70 and a lower radial isolator 72, provides a relatively low radial spring rate which acts to absorb energy when a fuel control housing is vibrated in directions perpendicular to the resolver axis.

Figure 2:
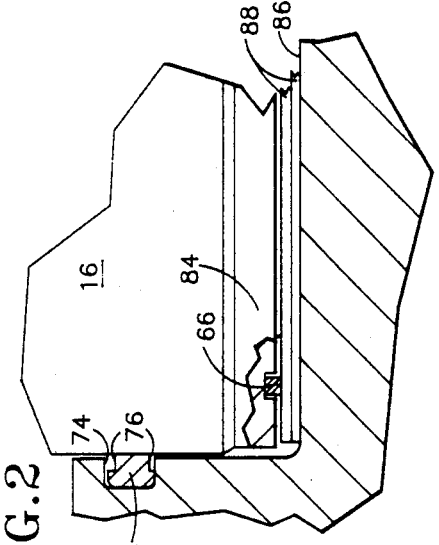
FIG. 2 is an enlarged view of a portion of FIG. 1.

Referring to FIG. 2, the ring-shaped lower radial isolator 72 has a t-shaped cross section. The isolator is located in a groove 74 within the first opening 20 about the lower third of the resolver 16. The t-shape provides two force free surfaces 76 to accommodate a bulging of the lower radial isolator when radial vibratory loads are applied thereto. It is desirable to construct the lower radial isolator of a long lasting material having a low modulus of elasticity such as an elastomer. A fluorosilicone based material is preferred.

Referring to FIG. 3, the upper radial isolator 70 is shown. The upper radial isolator provides a relatively low radial spring rate which acts to absorb energy when a fuel control housing is vibrated in directions perpendicular to the axis 54. The upper radial isolator fits in groove 71. The upper radial isolator consists of a split ring 78 having a square cross section and a split metallic backing 80. The metallic backing has a pair of tines 82 (see FIG. 5) extending upwardly therefrom. The metallic backing provides a supporting surface across the keyway 26 (see FIG.1) against which the split ring acts to isolate the resolver from vibration. It is desirable to construct the split ring of a long lasting material having a low modulus of elasticity such as an elastomer. A fluorosilicone based material is preferred.

Referring to FIG. 2, the lower axial isolator 66 is maintained between a bottom portion 84 of the resolver 16 and a bottom portion 86 of the first opening 20. Shims 88 may be inserted in the bottom portion 86 of the first opening to align the resolver with the top of the first opening, as will be discussed infra. The lower axial isolator (in conjunction with the upper axial isolator assembly 68 as will be discussed infra) provides a relatively low axial spring rate which acts to absorb energy when the housing is vibrated in directions parallel to the resolver axis. The lower isolator 66 is ring-shaped, has a square shaped cross section, and, as above, is constructed of an elastomer such as a fluorosilicone.

The upper axial isolator assembly 68 clamps the resolver 16 in place without imparting side loads. The upper axial isolator assembly provides (in conjunction with the lower axial isolator as will be discussed infra) a relatively low axial spring rate which acts to absorb energy when the housing is vibrated in directions parallel to the resolver axis.

The upper axial isolator assembly 68 is comprised of a support bracket 90 (see FIGS. 3, 4 and 5), a compression screw 92, an anti-rotation screw assembly 94, and a yoke 96.

The yoke 96 is generally y-shaped, having a pair of tines 98 extending from a body portion 100. Each tine has a flange portion 102 depending downwardly therefrom. A pad 104 is disposed on the bottom of each flange. It is desirable to construct each pad of a long lasting material having a low modulus of elasticity such as an elastomer. A fluorosilicone based elastomer is preferred. A hole 106 for receiving the anti-rotation screw assembly 94 passes through the body portion 100. The hole 106 is oversized to accommodate fuel control tolerances. A conical depression 108 is disposed within the body portion to receive the compression screw 92.

The compression screw 92 has a threaded upper end 110 and a lower end 112 of increased diameter. The lower end has a ball 114 fixedly attached thereto. The ball is designed to fit in the depression 108. The upper end of the compression screw is threadably received within the support bracket 90.

The support bracket 90 has an upper portion 116 having a threaded section 118 for receiving the compression screw 92, a pair of support legs 120, a base 122 (see FIG. 5) attaching to the legs and a flat portion 124 extending from the base.

The flat portion 124 defines a radial opening 126 having a notch portion 128. The radial opening is close fitting about the resolver 16 to act as a radial hard stop. The notch portion 128 is designed to receive the tab 64, as will be discussed infra. The flat portion provides a gauge for the preloading of the upper axial isolator assembly 68 and the lower axial isolator 66.

The base 122 has two sections 130 disposed over the resolver for maintaining the resolver within the first opening should the upper axial isolator assembly 68. Two openings 132 are disposed within the base for attaching the support bracket to the housing 10. The base has a hole 134 disposed therein for receiving a shaft 136 (see FIG. 3) of a rocker button 138. The rocker button has a curved surface 140 for cooperating with the anti-rotation screw assembly 94.

Referring to FIG.3, the anti-rotation screw assembly 94 has a threaded top portion 142, a body portion 144 and a lower portion 146 of increased dimension. The lower portion has a recessed section 148 for cooperating with the curved surface 140 of the rocker button 138. The anti-rotation screw is clamped to the yoke 96 by means of a pair of washers 150 and a lock nut 152.

The vibration isolation assembly (or kit) is utilized by placing the lower axial isolator 66 in the first opening 20. The lower radial isolator 72 is disposed within the groove 74. The upper radial isolator 70 is installed over the top of the resolver 16. The tines 82 of the metallic backing 80 are pressed together so that the resolver 16 may be inserted within the first opening (and so the upper radial isolator fits in groove 71). The resolver passes through the lower radial isolator 72 and abuts the lower axial isolator 66.

The communication wires 58 of the resolver pass through the keyway 26. The metallic backing 80 of the upper radial isolator extends across the keyway 26. The upper axial isolator assembly 68 is then fastened to the housing 10 over the resolver 16 by any suitable means such as bolts 152 which pass through openings 132. The resolver is positioned so that tab 64 is disposed within the notch portion 128 to calibrate the fuel control. The tab also serves as an anti-rotation key in the event of a failure.

The yoke 96 of the upper axial isolator assembly 68 is free to pivot about an axis 154 (see FIG.4) extending from the rocker button 138 through the ball 114 within the compression screw 92. The compression screw is tightened to compress the resolver 16 between the elastomeric pads 104 upon the tines 102 and the lower axial isolator 66. The proper degree of compression (about 0.005 to 0.009 inches) is obtained when the resolver is flush with the flat portion 124 which acts as a gauge. The degree of compression maximizes the ability of the isolators to insulate the resolver from the vibrational fields within the housing without excessive motion of the resolver or wear of the elastomeric rings or pads.

If the resolver 16 is not positioned squarely in the first opening (i.e. cocked off to one side due to side loading), metal to metal contact between the resolver and the housing 10 or the flat portion 124 of the support bracket 90 may occur, and improper meshing of the resolver gear teeth 52 and the sector gear teeth 48, may occur. The yoke 96 minimizes side loading by providing equal spring loads via the elastomeric pads 104 attached to the tines 102. Because the yoke may pivot about the axis 154, the loads applied to each pad are equal thereby minimizing side loading.

Tight concentricity control is required for the radial isolators to provide not only constant cross-section and uniform spring rate, but also to position the resolver properly in the first opening so that the resolver gear teeth 52 remain properly meshed with the segment gear teeth 48. Such concentricity control assures that the resolver body does not contact the fuel control housing metal to metal.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

We claim:

1. An improved fuel control assembly of the type having a housing, a metering valve mounted in the housing for regulating fuel flow, and position feedback apparatus, including a resolver assembly having a rotor coupled at one shaft end thereof to the metering valve, to provide a signal indication of the metering valve position, the improvement comprising:

a mounting cavity formed in the fuel control housing for receiving the resolver therein, said mounting cavity having a volume larger than the displacement of the resolver body to permit placement of the resolver therein with a spatial void therebetween;

plurality of vibration isolators, each comprising a resilient material and each adapted to compress within the spatial void, between the resolver body and the cavity inner wall, to positionally fix the resolver in spaced relation to the cavity inner wall surface; and mounting apparatus for engaging a first end of the resolver body with the fuel control housing in a manner to provide compressive loading of the resolver body against the vibration isolators, within the cavity.

2. The assembly of claim 1, wherein said vibration isolators are placed in position along the resolver body at points radial to the resolver's rotor axis, to minimize radial displacement of the rotor in response to forces applied to the control housing.

3. The assembly of claim 1, wherein vibration isolators are placed at the opposite axial ends of the resolver body, one placed between the resolver's said first end and said mounting apparatus and one placed between the cavity wall and the resolver's mounting location for the rotor, to minimize axial displacement of the rotor in response to forces applied to the control housing.

4. An improved fuel control assembly of the type having a housing, a metering valve mounted in the housing for regulating fuel flow, and position feedback apparatus, including a resolver assembly having a rotor coupled at one shaft end thereof to the metering valve, to provide a signal indication of the metering valve position, the improvement comprising:

a housing, having a cavity formed therein with a volume greater than the displacement volume of the resolver, to permit, with the exception of exposure of a first end of the resolver, enclosure of the resolver body within said cavity with a spatial void between the resolver body and said cavity wall surface;

vibration isolators, each comprising a resilient material, and including a first said vibration isolator having a bifurcated geometry adapted for placement at said first end of the resolver to provide positioning of said first end within said cavity in each of an axial aspect and a radial aspect to the resolver's rotor axis, a second said vibration isolator adapted for placement between said cavity wall surface and the resolver mounting location for the rotor, and a third said vibration isolator adapted for placement between the resolver body and the cavity wall at a point radial to the resolver's rotor axis, said vibration isolators positionally fixing the resolver body in spaced relation, both axially and radially, to the cavity wall surface; and mounting apparatus, for engaging said first end of the resolver with the fuel control housing in a manner to provide compressive loading of the resolver body against the vibration isolators within the cavity.

* * * * *